March 8, 1932. N. R. KRAUSE 1,848,359
DRAWBAR FOR IMPLEMENTS
Filed Feb. 24, 1931
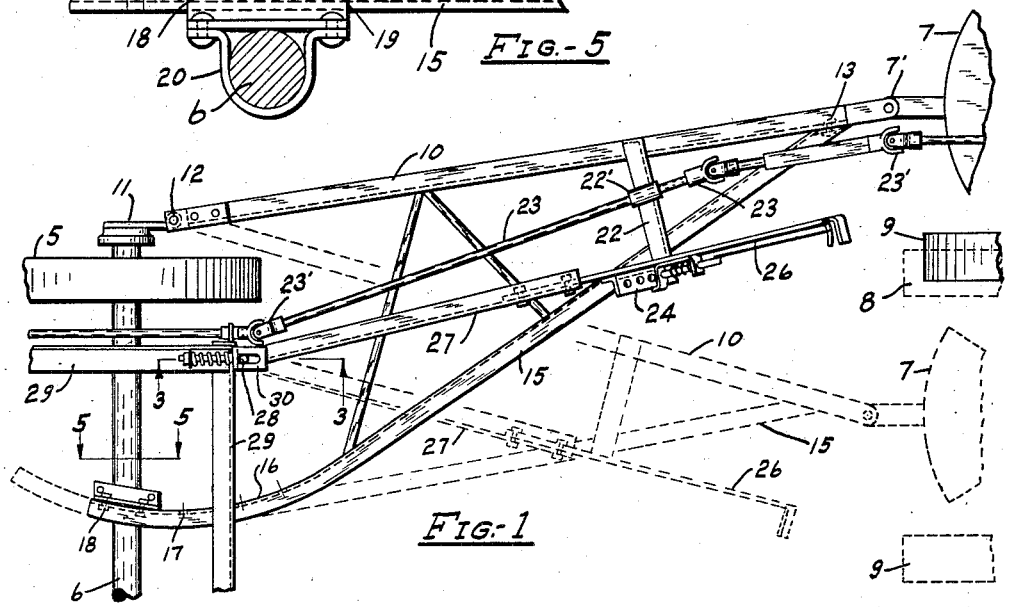

Patented Mar. 8, 1932

1,848,359

UNITED STATES PATENT OFFICE

NORMAN R. KRAUSE, OF RACINE, WISCONSIN, ASSIGNOR TO J. I. CASE COMPANY, OF RACINE, WISCONSIN, A CORPORATION

DRAWBAR FOR IMPLEMENTS

Application filed February 24, 1931. Serial No. 517,690.

My present invention relates to drawbar equipment for agricultural and like implements, and more particularly corn pickers, requiring considerable maneuvering during field operations and when passing through gateways and over roads, my object being to provide a drawbar not only capable of attachment to a tractor and implement for hauling purposes but which may be manipulated to adjust parts of the corn picker and itself adjusted for both field and road purposes.

In the accompanying drawings, forming part hereof, Figure 1 is a plan view of my improved drawbar showing its application to an implement and tractor; Fig. 2, a side elevation of the structure; Fig. 3, a detail section taken on the dotted line 3—3 of Fig. 1; Fig. 4, a detail section taken on the dotted line 4—4 in Fig. 2; and Fig. 5 is a detail section as seen when looking in the direction of the arrows 5—5 in Fig. 1.

In said drawings the numeral 5 indicates an implement wheel supported by an axle 6, a tractor body being indicated at 7 and its wheels at 8, 9.

My improvement comprises a main drawbar 10 pivoted to the axle 6 or its equivalent by a hinged trunnion 11, or other suitable connection to be adjusted in vertical directions, and is further hinged or pivoted to said trunnion 11, at 12, so that it may be adjusted laterally. Attached to the end of the main bar 10, as at 13, and extending rearwardly therefrom, is a supplemental drawbar 15, preferably formed of channel iron and slightly curved in the manner substantially as shown in Fig. 1, a web 16 thereof having holes 17 therein adapted to receive bolts 18 by which it is secured to an anchor 19 supported on axle 6 by the loop 20. The bars 10 and 15 are suitably trussed as indicated or so braced as to comprise, with the axle or part to which it is connected, a triangular unit, the forward end of bar 10 being pivotally connected to the tractor drawbar 7'. A preferably rectangular frame 22 connects said bars 10 and 15 and which supports a power take-off shaft 23, preferably of a flexible character embodying the universal joints 23', extending from the tractor 7 to driven mechanism of an implement (not shown) to be actuated, and which shaft is telescopically mounted in the sleeve 22'. The frame 22 also supports a quadrant 24 pivotally connected thereto at 24' embodying a series of holes 25 engageable with a lever 26 of well known construction having a rearward extension 27 the end of which is pivotally connected at 28, to an implement part, as a frame 29, by means of a slotted plate 30, which preferably is a web of angle-iron 30', and to which pivot, which is mounted in a tubular manner 31, a brace 32 is secured and terminates in a slotted connection 33 with said lever extension 27, so that said lever and bars may be swung laterally as a unit and the lever vertically adjusted. As the lever is also utilized for tilting the frame 29 or other structure mounted on the axle 6, I secure to the pivot structure a ringed tension rod 34 about which a spring 35 is coiled and is held between the lever supporting plate 30 and the nut 36, the rod passing through said plate, and by which when the lever is vertically adjusted a yielding action is imparted by the spring 35 to relieve strain on the assembled parts and for absorbing shocks incident to the movement of the implement over ground irregularities.

It will therefore be seen that the bars 10, 15, frame 22, sectional power shaft 23, quadrant 24, and lever 26, with parts associated therewith, assembled in the manner substantially as described, constitute a unitary structure, and that the various hinge or pivotal connections between the parts, although located in irregular relation to each other, all coact during the vertical and lateral swinging of the drawbar unit so that the movement thereof will be free and unrestricted, and the adjustment of the unit therefore may be readily accomplished. By reference to Fig. 1, which illustrates an example of the use of my improvement in connection with an implement drawn through crop rows, it will be understood that it is essential for best results that the tractor wheels travel between hills where the crop has been removed, so that consequently the tractor is in lateral relation to the implement which is in the path of the standing rows, as corn, to be picked. With only a single draft member, as 10, considerable side strain between the tractor and implement would exist, but by connecting the supplemental bar 15 to the bar 10 and fixedly securing its curved end to the rocking anchor 19 the strain becomes so equalized through both bars as to obviate any tendency of the implement to swerve laterally through the draft between it and the tractor, so that each of these moving elements will follow its predetermined straight course through the crop rows, and, both bars being pivotally connected to the implement and supporting the flexible power shaft, and the lever 26 being yieldingly connected with the implement and slidably connected to brace 32 and extension 27, while the quadrant 24 is also yieldingly mounted, it will be seen that the unitary drawbar equipment is instantly responsive to the vibrations or shocks to which the implement is subjected while traversing ground inequalities, as well as the connected relation of the power shaft preserved by its telescopic mounting in sleeve 22', and therefore its structural assemblage is maintained without undue torsional or other straining of its parts.

When leaving the field it is necessary to reduce the width of the combined tractor and implement in order to travel through narrow passageways and over roads, and this I readily accomplish by releasing the bar 15 from its connection with the anchor 19 whereupon the tractor may be steered in an inwardly direction relative to the implement so that its body and wheels will occupy the position indicated in dotted lines in Fig. 1 to be directly in front of and in alinement with the implement. This movement of the tractor carries the drawbar equipment in like direction, the changed position of the bars 10 and 15 through said action being indicated by dotted lines, and when the tractor and said equipment have been positioned in alinement with the implement the parts may be fixedly retained in such position by means of the bolts 18 and holes 17 for securing bar 15 and its anchor 19 together, the end of said bar moving in a curvilinear direction to properly follow its pivotal point at 12, while at the same time power shaft 23 being slidably mounted in relation to its support 22' will be constantly maintained in proper driving action during the range of movements of the drawbar.

I claim as my invention:

1. In a device of the character described, a main bar, means for pivotally connecting the same to an implement whereby said bar may be vertically and laterally adjusted, a supplemental bar connected to the main bar, means for pivotally connecting the supplemental bar to an implement whereby said latter bar may be simultaneously vertically adjusted with the main bar, and means for detaching said supplemental bar from its pivotal connecting means so that said bar may be simultaneously laterally adjusted with the main bar.

2. In a device of the character described, a main bar having means for pivotally connecting it to a tractor, means at its opposite end for pivotally connecting it to an implement whereby said bar may be vertically adjusted, a supplemental bar connected at its forward end to the main bar, means for pivotally connecting the opposite end of the supplemental bar to an implement whereby it may be vertically adjusted simultaneously with said main bar, means for releasing the supplemental bar from said implement, and means for pivotally connecting the main bar to the implement whereby said bar and the supplemental bar when so released may together be laterally adjusted in relation to the implement.

3. In a device of the character described, a main bar having means for pivotally connecting it to an implement, a supplemental bar connected to the main bar and pivotally connected to the implement, means associated with said bars for supporting a power shaft, a lever supported by said bars, and means connecting said lever and implement whereby the lever may be vertically adjusted to tilt the implement and laterally adjusted to swing said bars.

4. In a device of the character described, the combination, with the drawbar members, of a lever support, a lever movably mounted thereon, a brace flexibly connected to the lever, a pivot upon which said lever and brace are mounted to swing laterally, and yielding means connecting the pivot to an implement for absorbing vibration and shock incident to ground irregularities over which the implement travels.

5. In a device of the character described, a main drawbar having its end adapted to be pivotally connected to a tractor and its opposite end pivotally connected to an implement, a supplemental bar connected to the main bar and pivotally connected to said implement, said bars cooperating to normally maintain a tractor and an implement in offset relation to each other, means on said bars for supporting a power shaft having its forward end connected to a tractor and its opposite end pivotally connected to said implement, and means for releasing the supplemental bar from the implement whereby when said tractor is steered to alined position in relation to the implement said pivotally connected parts will coact in like movement to maintain the tractor and implement in alinement upon securing the supplemental bar to the implement.

6. The combination, with an implement, of a drawbar comprising a main and supplemental member connected together and pivoted to the implement to simultaneously swing vertically, means associated with the drawbar for supporting a power shaft having its forward end connected to a tractor and its opposite end connected to said implement, locking means for securing the supplemental member to the implement, and means associated with the main member whereby the latter and the supplemental member may be laterally swung together when said locking means are released.

7. The combination, with an implement axle, of a drawbar having a main member, means connecting the axle and member whereby the latter may be swung vertically and laterally, a supplemental member connected to the main member, a rocking anchor on the axle to which the supplemental member is detachably connected, and means for securing the supplemental member to the anchor whereby when the main member is swung laterally said supplemental member will be simultaneously moved in the same direction.

8. In a device of the character described, a main bar, means for pivotally connecting the same to an implement, a curved supplemental bar connected to the main bar and pivotally connected to the implement to swing vertically with said main bar, means connected with said bars for supporting a power shaft having its forward end connected to a tractor and its opposite end connected to said implement, and pivotal means associated with the main bar whereby the same and said supplemental bar may be moved laterally.

9. In a drawbar, a laterally and vertically swinging main member, a vertically swinging supplemental member pivotally mounted upon an implement, means on the drawbar for supporting a flexible power shaft, means for fixedly maintaining the drawbar in outward and inward positions in relation to an implement, and means supported on the drawbar and connected to an implement for tilting the latter.

10. The combination, with a drawbar, of a yieldingly mounted quadrant, a lever embodying a slot engaging the quadrant, an extension member slidably connected to the lever, a brace having one of its ends slidably connected to the lever, yielding means connecting the extension and brace, and means connecting said yielding means to an implement whereby the latter may be tilted by the adjustment of said lever.

11. The combination, with an implement and a tractor, of a drawbar pivoted to the implement to swing vertically and laterally in relation thereto, means for connecting the drawbar to a tractor for maintaining the latter in lateral relation to the implement, means for releasing the drawbar from the implement whereby the tractor may be steered into alinement with the implement and move said drawbar inwardly in relation to the latter, and means for securing the drawbar to maintain the tractor in longitudinal alinement with an implement.

12. The combination, with an implement and a tractor, of a drawbar pivoted to the implement to swing vertically and laterally, means for connecting the drawbar to a tractor for maintaining it in lateral relation to the implement, means on the drawbar for supporting a power shaft connected to the implement and tractor, means for releasing the drawbar from the implement whereby the tractor may be steered into alinement with the implement and move said drawbar inwardly in relation to the latter, and means for securing the drawbar to maintain the tractor in longitudinal alinement with the implement.

In testimony whereof I affix my signature.

NORMAN R. KRAUSE.